(12) United States Patent
Li et al.

(10) Patent No.: US 11,913,698 B2
(45) Date of Patent: Feb. 27, 2024

(54) SELF-PRESSURE-RELIEF AIR DISTRIBUTION MECHANISM AND CRYOGENIC REFRIGERATOR USING SAME

(71) Applicant: CSIC PRIDE (NANJING) CRYOGENIC TECHNOLOGY CO., LTD., Nanjing (CN)

(72) Inventors: Ao Li, Nanjing (CN); Jinhong Ge, Nanjing (CN); Chenxi Xia, Nanjing (CN); Zhipo Zhou, Nanjing (CN)

(73) Assignee: CSIC PRIDE (NANJING) CRYOGENIC TECHNOLOGY CO., LTD., Nanjing (CN)

( * ) Notice: Subject to any disclaimer, the term of this patent is extended or adjusted under 35 U.S.C. 154(b) by 749 days.

(21) Appl. No.: 17/048,902

(22) PCT Filed: May 16, 2018

(86) PCT No.: PCT/CN2018/087142
§ 371 (c)(1),
(2) Date: Mar. 17, 2021

(87) PCT Pub. No.: WO2019/200645
PCT Pub. Date: Oct. 24, 2019

(65) Prior Publication Data
US 2021/0207852 A1    Jul. 8, 2021

(30) Foreign Application Priority Data

Apr. 19, 2018  (CN) .......................... 201810355675.6

(51) Int. Cl.
*F25B 9/14*    (2006.01)
*F25B 41/20*   (2021.01)
(Continued)

(52) U.S. Cl.
CPC ............ *F25B 9/145* (2013.01); *F16K 11/074* (2013.01); *F16K 47/04* (2013.01); *F25B 41/20* (2021.01)

(58) Field of Classification Search
CPC .. F25B 9/145; F25B 41/20; F25B 9/14; F25B 2309/006; F16K 11/074; F16K 47/04
See application file for complete search history.

(56) References Cited

FOREIGN PATENT DOCUMENTS

| CN | 101012980 A | 8/2007 |
|---|---|---|
| CN | 102844634 A | 12/2012 |

(Continued)

OTHER PUBLICATIONS

CN 105318040 A Translation (Year: 2016).*
(Continued)

*Primary Examiner* — Elizabeth J Martin
*Assistant Examiner* — Dario Antonio Deleon
(74) *Attorney, Agent, or Firm* — Gary J. Gershik

(57) ABSTRACT

A self-pressure-relief air distribution mechanism includes an air distribution valve (6) where a rear face of the air distribution valve (6) is divided into a high-pressure face (66) and a low-pressure face (65), each hermetically separated by a third sealing ring (b3) that seals the air distribution valve (6) and a cover (2). A low-pressure passage (22) of the cover (2) can communicate with the rear face of the air distribution valve (6) via a pressure-relief hole (61), to guide a low-pressure airflow in the cover (2) to the rear face of the air distribution valve (6). A cryogenic refrigerator includes the self-pressure-relief air distribution mechanism. With the provision of the pressure-relief hole (61) and the third sealing ring (b3), the self-pressure-relief air distribution mechanism has a reduced pressure receiving area, thereby reducing a positive acting force and reducing wear.

12 Claims, 4 Drawing Sheets

(51) Int. Cl.
*F16K 11/074* (2006.01)
*F16K 47/04* (2006.01)

(56) References Cited

FOREIGN PATENT DOCUMENTS

| | | | | |
|---|---|---|---|---|
| CN | 105318040 A | * | 2/2016 | ............ F16K 11/074 |
| CN | 208138518 U | | 11/2018 | |
| JP | 2001349630 A | | 12/2001 | |
| WO | WO 2019/200645 A1 | | 10/2019 | |

OTHER PUBLICATIONS

International Search Report dated Jan. 9, 2019 in connection with PCT International Application No. PCT/CN2018/087142.
Written Opinion (form PCT/ISA/237) dated Jan. 9, 2019 in connection with PCT International Application No. PCT/CN2018/087142.

\* cited by examiner

US 11,913,698 B2

SELF-PRESSURE-RELIEF AIR DISTRIBUTION MECHANISM AND CRYOGENIC REFRIGERATOR USING SAME

CROSS-REFERENCE TO RELATED APPLICATIONS

This application is a § 371 national stage of PCT International Application No PCT/CN2018/087142, filed May 16, 2018, claiming priority of Chinese Patent Application No. 201810355675.6, filed. Apr. 19, 2018, the contents of each of which are hereby incorporated by reference herein.

BACKGROUND

Technical Field

The present invention relates to the technical field of cryogenic refrigerators, and specifically, to a self-pressure-relief air distribution mechanism that reduces a positive pressure and reduces wear by modifying the structure of an air distribution valve, and a cryogenic refrigerator using the self-pressure-relief air distribution mechanism.

Related Art

An ultra-low temperature refrigerator represented by a Gifford-McMahon (GM) refrigerator has an expander and a compressor for working gas (also referred to as refrigerant gas). For such a refrigerator, a vented high-pressure airflow is provided by the compressor, enters, through an air distribution mechanism, a push piston that is placed in a cylinder and that reciprocates up and down, exchanges heat with a cold storage material, then does work and expands in an expansion chamber, then flows out of the air distribution mechanism through the push piston, and returns to a low-pressure chamber of the compressor. Through the foregoing continuous cyclic process, a refrigeration effect is achieved.

Specifically, such a refrigerator as shown in FIG. 1 includes a compressor 1, a cover 2, a cylinder 13, and a push piston 10. A motor 12 and a driving cam 3 are mounted in the cover 2. An eccentric cam handle 31 on the cam 3 drives a connecting rod 5 to convert a rotary motion into an up-down alternating motion, thereby driving the push piston to move up and down in the cylinder 13. An air distribution mechanism RV is formed by an air distribution valve 6 and a rotary valve 7. The air distribution valve 6 is mounted in the cover 2, is fixed in the cover by a positioning pin 16, and is arranged coaxially with the rotary valve 7. The cam handle 31 drives the rotary valve 7 mounted on a bearing 14 to rotate around a rotation axis. The compressor 1 inhales and compresses refrigerant gas, and discharges it as high-pressure refrigerant gas. A high-pressure exhaust pipe 1a supplies the high-pressure refrigerant gas to the cover 2, and delivers, through a high-pressure air hole 62 on the air distribution valve 6, the high-pressure refrigerant gas to a high-pressure groove 72 on the rotary valve 7 having airtight adhesion to the high-pressure air hole. A low-pressure hole 71 is provided on the rotary valve 7, and the low-pressure hole 71 communicates with a low-pressure passage 22 in the cover 2. According to the position shown in FIG. 1, the low-pressure hole 71 overlaps and communicates with an air distribution valve air hole 63 on the air distribution valve 6. In this case, the system is at a low-pressure exhaust stage. The gas in an expansion chamber 9 changes from high pressure to low pressure, flows out through a piston rear hole 10b, a cold storage material 10c, and a piston front hole 10a on the push piston in sequence, and returns to a low-pressure suction pipe 1b of the compressor 1. After the rotary valve 7 rotates by a specific angle, the low-pressure hole 71 does not communicate with the air distribution valve air hole 63 on the air distribution valve 6. Instead, the high-pressure groove 72 on the rotary valve 7 communicates with the air distribution valve air hole 63 on the air distribution valve 6. The high-pressure gas discharged from the compressor 1 enters the cylinder 13 through the high-pressure air hole 62 on the air distribution valve 6 and the high-pressure groove 72 that is on the rotary valve 7 and that communicates with the high-pressure air hole, and enters the expansion chamber 9 through the piston front hole 10a, the cold storage material 10c, and the piston rear hole 10b on the push piston in sequence. In the foregoing process, the high-pressure gas discharged from the compressor 1 acts on a rear face of the air distribution valve 6. In reliance on a positive pressure on an area of the rear face parallel to an air distribution face 64, the air distribution valve 6 tightly adheres to the rotary valve 7. In this way, the high-pressure valve and the low-pressure valve on the air distribution mechanism are separated, to separate the high-pressure airflow and the low-pressure airflow. In the conventional structure, the magnitude of the positive pressure is in direct proportion to the square of an outer diameter D1 of the air distribution valve 6. High-pressure contact between the air distribution valve 6 and the rear face provides a positive high pressure, to press a switching plane 73 against the air distribution face 64, thereby preventing the high-pressure airflow and the low-pressure airflow from mixing with each other. However, the high-pressure air hole 62 and the air distribution valve air hole 63 on the air distribution valve 6 have certain size and position requirements, so that the outer diameter D1 of the air distribution valve 6 cannot be too small. Otherwise, the high-pressure air hole 62 and the air distribution valve air hole 63 cannot be made. In this case, the positive pressure for adhesion is relatively large, and long-term operation will cause wear of a contact surface of the rotary valve 7 and the air distribution valve 6, which affects the performance of the equipment and reduces the reliability of the equipment.

SUMMARY

An objective of the present invention is to provide, for the problem in the related art, a self-pressure-relief air distribution mechanism that reduces a positive pressure and reduces wear by modifying the structure of an air distribution valve, and a cryogenic refrigerator using the self-pressure-relief air distribution mechanism.

The objective of the present invention is achieved by the following technical solutions.

A self-pressure-relief air distribution mechanism is provided, including an air distribution valve and a rotary valve, where a rear face of the air distribution valve is divided into a high-pressure face and a low-pressure face, the high-pressure face is located in the middle of the low-pressure face, and the high-pressure face and the low-pressure face are hermetically separated by a third sealing ring that seals the air distribution valve and a cover; and the air distribution valve is provided with a pressure-relief hole that axially penetrates an air distribution face and the low-pressure face of the air distribution valve, a low-pressure passage of the cover can communicate with the rear face of the air distribution valve via the pressure-relief hole, and a low-pressure airflow in the cover can be guided to the rear face of the air distribution valve through the pressure-relief hole, to reduce a positive pressure between the air distribution face and a switching plane of the rotary valve.

A pressure-relief-hole inner-edge inner-diameter D3 of an inner edge circle formed by points corresponding to an inner edge of the pressure-relief hole surrounding an axis of the air distribution valve is greater than an outer diameter D5 of the switching plane.

The outer diameter D5 of the switching plane is greater than an outer diameter D4 of a switching region formed by a low-pressure hole and a high-pressure groove on the rotary valve.

An outer diameter D2 of a sealing face corresponding to the high-pressure face is smaller than the outer diameter D4 of the switching region formed by the low-pressure hole and the high-pressure groove on the rotary valve.

When the high-pressure face protrudes relative to the low-pressure face, a portion corresponding to the high-pressure face is embedded in a mounting chamber of the cover, and a sealing groove is provided on an inner wall of the mounting chamber, where the third sealing ring is embedded in the sealing groove to hermetically separate the high-pressure face and the low-pressure face.

When the high-pressure face is sunk relative to the low-pressure face, a protruding portion of the cover is embedded in a groove corresponding to the high-pressure face, and a sealing groove is provided on an inner wall of the groove, where the third sealing ring is embedded in the sealing groove to hermetically separate the high-pressure face and the low-pressure face.

The air distribution valve is provided with a high-pressure air hole that axially penetrates the air distribution valve, and an air distribution valve air hole that penetrates the air distribution valve in a folded direction, where the high-pressure air hole can communicate with a high-pressure exhaust pipe of a compressor, and the air distribution valve air hole can communicate with a cover air hole on the cover.

The high-pressure air hole can communicate with the air distribution valve air hole and the cover air hole through the high-pressure groove on the rotary valve, or the air distribution valve air hole communicates with the low-pressure passage on the cover through the low-pressure hole that penetrates the rotary valve.

A first sealing ring and a second sealing ring that are embedded in an inner wall of a mounting chamber of the cover are provided on a circumferential surface of the air distribution valve to seal the air distribution valve laterally.

A cryogenic refrigerator using a self-pressure-relief air distribution mechanism is provided, where the cryogenic refrigerator includes the foregoing self-pressure-relief air distribution mechanism, an air distribution valve of the self-pressure-relief air distribution mechanism is eccentrically fixed on a cover through a valve body positioning pin, and a spring is embedded in a region on a high-pressure face of the air distribution valve; and a rotary valve of the self-pressure-relief air distribution mechanism is positioned in the cover through a bearing.

Compared with the related art, the present invention has the following advantages:

In the present invention, the pressure-relief hole is provided, and the pressure receiving face of the air distribution valve is divided into the low-pressure face and the high-pressure face. The low-pressure airflow in the cover can be guided to the rear face of the air distribution valve through the pressure-relief hole, to reduce a high-pressure force receiving area of the rear face of the air distribution valve, thereby reducing the positive pressure between the air distribution face and the switching plane of the rotary valve, reducing plane wear, and prolonging the service life of the equipment.

Figure 1:
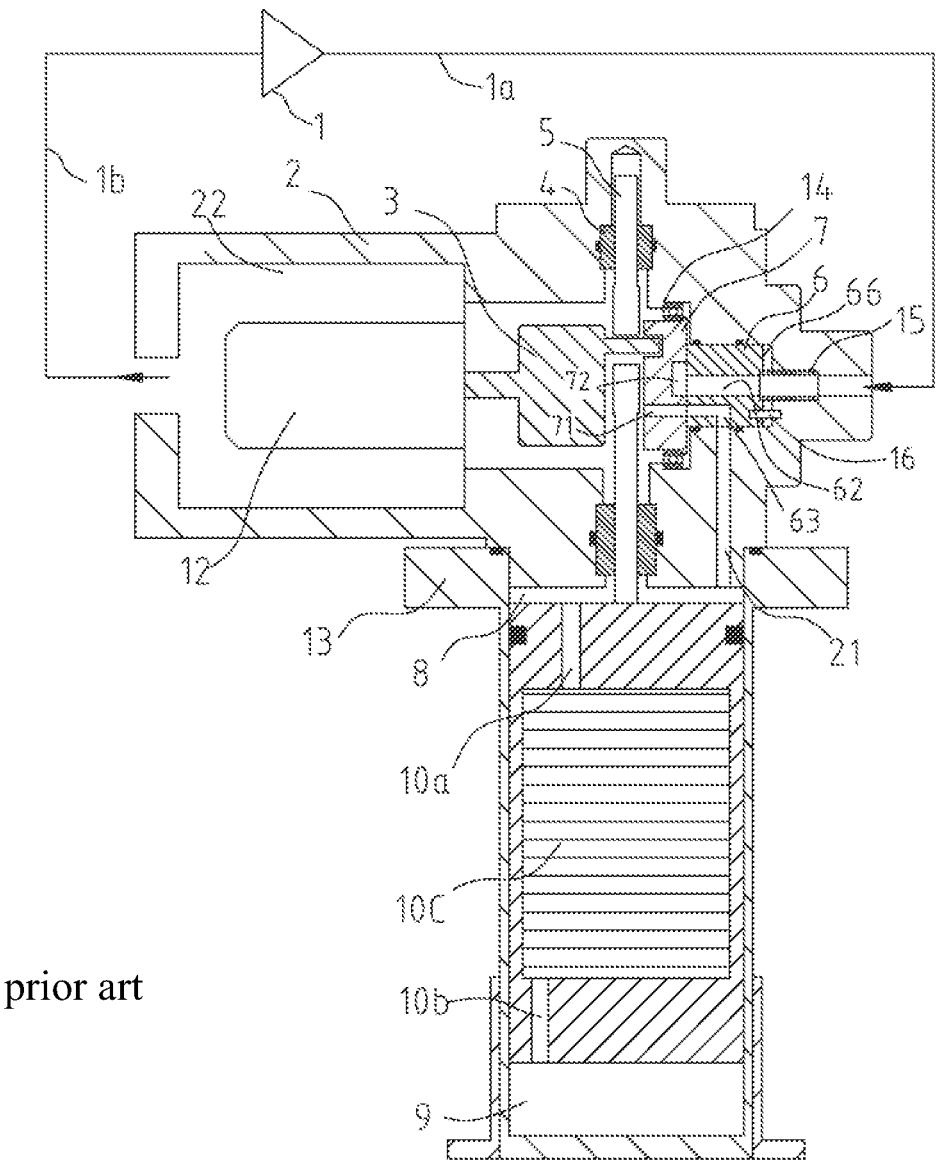
FIG. 1 is a schematic structural diagram of a cryogenic refrigerator with a conventional air distribution mechanism.
Figure 2:
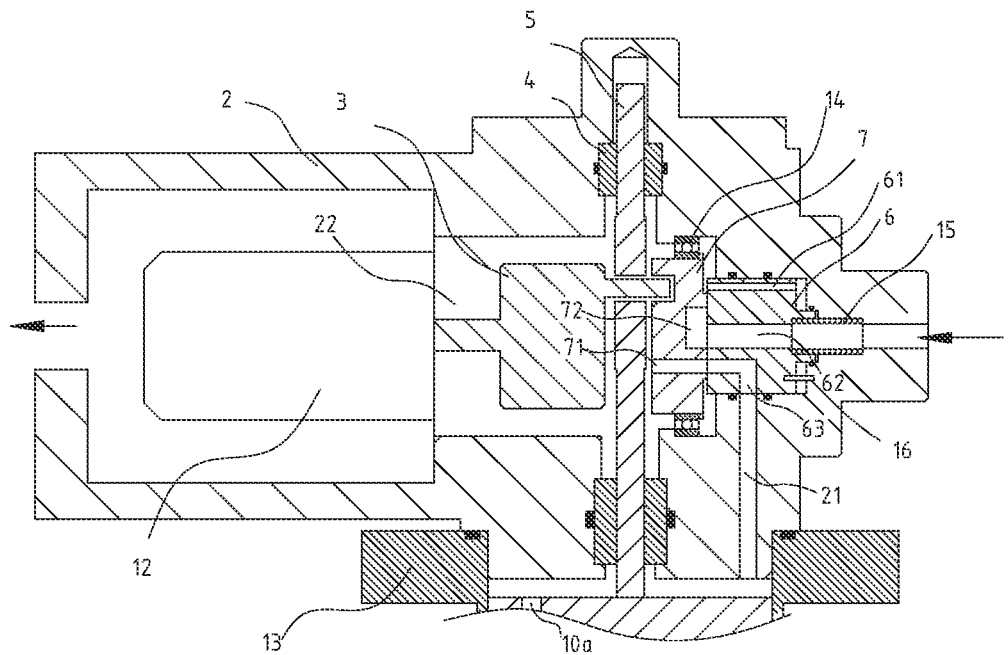
FIG. 2 is a schematic diagram of an assembly mechanism of an air distribution mechanism mounted in a cover.

1. Compressor; 1a. High-pressure exhaust pipe; 1b. Low-pressure suction pipe; 2. Cover; 21. Cover air hole; 22. Low-pressure passage; 3. Cam; 31. Eccentric cam handle; 4. Guide sleeve; 5. Connecting rod; 6. Air distribution valve; 61. Pressure-relief hole; 62. High-pressure air hole; 63. Air distribution valve air hole; 64. Air distribution face; 65. Low-pressure face; 66. High-pressure face; 7. Rotary valve; 71. Low-pressure hole; 72. High-pressure groove; 73. Switching plane; 8. Heat chamber; 9. Expansion chamber; 10a. Piston front hole; 10b. Piston rear hole; 10c. Cold storage material; 12. Motor; 13. Cylinder; 14. Bearing; 15. Spring; 16. Valve body positioning pin; b1. First sealing ring; b2. Second sealing ring; b3. Third sealing ring.

DETAILED DESCRIPTION

The present invention is further described below with reference to the accompanying drawings and embodiments.

As shown in FIG. 2 to FIG. 7, a self-pressure-relief air distribution mechanism is provided, including an air distribution valve 6 and a rotary valve 7. The air distribution valve 6 is provided with a high-pressure air hole 62 that axially penetrates the air distribution valve 6, and an air distribution valve air hole 63 that penetrates the air distribution valve 6 in a folded direction, where the high-pressure air hole 62 can communicate with a high-pressure exhaust pipe 1a of a compressor 1, and the air distribution valve air hole 63 can communicate with a cover air hole 21 on a cover 2. Meanwhile, the high-pressure air hole 62 can communicate with the air distribution valve air hole 63 and the cover air hole 21 through a high-pressure groove 72 on the rotary valve 7, or the air distribution valve air hole 63 communicates with a low-pressure passage 22 on the cover 2 through a low-pressure hole 71 that penetrates the rotary valve 7. A first sealing ring b1 and a second sealing ring b2 that are embedded in an inner wall of a mounting chamber of the cover 2 are provided on a circumferential surface of the air distribution valve 6 to seal the air distribution valve 6 laterally. In this way, the air distribution valve air hole 63 on the air distribution valve 6 is hermetically connected to the cover air hole 21 on the cover 2, and does not communicate with gas from another position. The air distribution valve air hole 63 is the only channel for high-pressure gas and low-pressure gas that enter or flow out of a cylinder 13. A rear face of the air distribution valve 6 is divided into a high-pressure face 66 and a low-pressure face 65, the high-pressure face 66 is located in the middle of the low-pressure face 65, and the high-pressure face 66 and the low-pressure face 65 are hermetically separated by a third sealing ring b3 that seals the air distribution valve 6 and the cover 2; and the air distribution valve 6 is provided with a pressure-relief hole 61 that axially penetrates an air distribution face 64 and the low-pressure face 65 of the air distribution valve 6, the low-pressure passage 22 of the cover 2 can communicate with the rear face of the air distribution valve 6 via the pressure-relief hole 61, and a low-pressure airflow in the cover 2 can be guided to the rear face of the air distribution valve 6 through the pressure-relief hole 61, to reduce a positive pressure between the air distribution face 64 and a switching plane 73 of the rotary valve 7.

In the foregoing structure, the switching plane 73 of the rotary valve 7 tightly adheres to the air distribution face 64 of the air distribution valve 6, and the switching plane 73 does not cover the pressure-relief hole 61 on the air distribution valve 6, to ensure that the pressure-relief hole 61 is smoothly connected to the low-pressure passage 22 in the cover 2. There is low-pressure gas inside the pressure-relief hole 61. An outer diameter D5 of the switching plane 73 shown in FIG. 7 should satisfy the following conditions: the outer diameter D5 of the switching plane 73 is smaller than a pressure-relief-hole inner-edge inner-diameter D3 of an inner edge circle formed by points corresponding to an inner edge of the pressure-relief hole 61 surrounding an axis of the air distribution valve 6; the outer diameter D5 of the switching plane 73 is greater than an outer diameter D4 of a switching region formed by the low-pressure hole 71 and the high-pressure groove 72 on the rotary valve 7; and an outer diameter D2 of a sealing face corresponding to the high-pressure face 66 is smaller than the outer diameter D4 of the switching region formed by the low-pressure hole 71 and the high-pressure groove 72 on the rotary valve 7.

Figure 3:
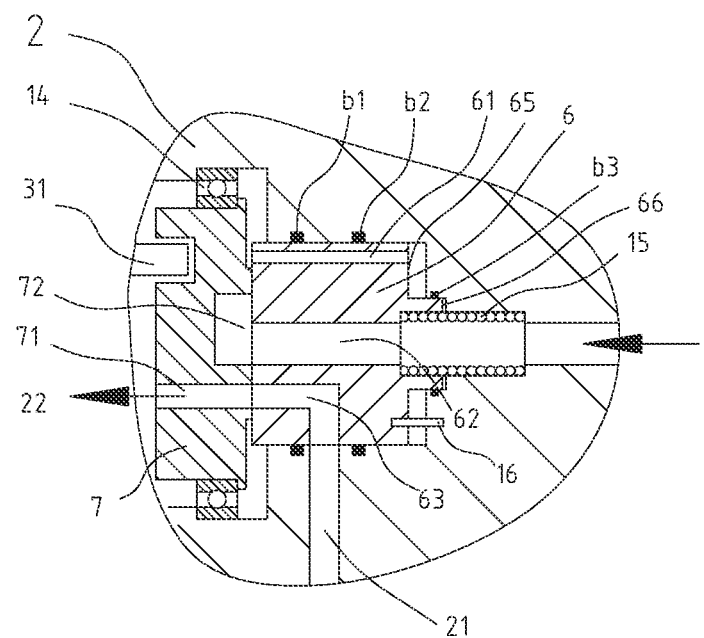
FIG. 3 is a schematic structural diagram of an air distribution mechanism when a low-pressure air passage is in a communicating state according to the present invention.
Figure 4:
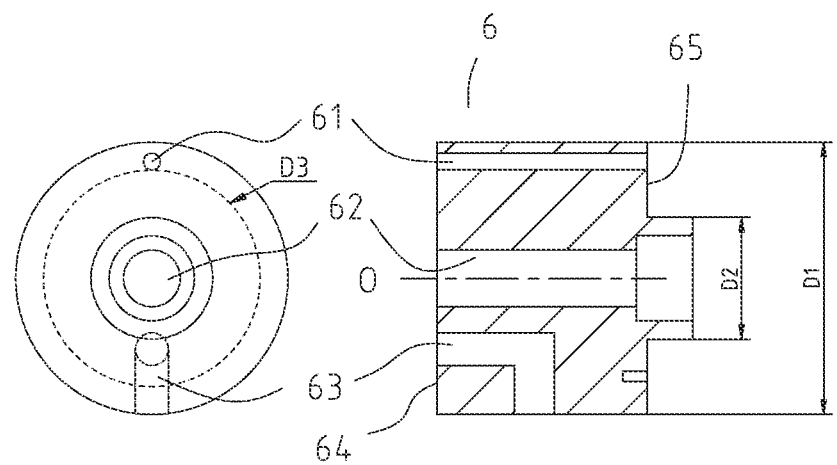
FIG. 4 is a detailed schematic structural diagram of an air distribution valve in FIG. 3.

As shown in FIG. 3 and FIG. 4, when the high-pressure face 66 protrudes relative to the low-pressure face 65, a portion corresponding to the high-pressure face 66 is embedded in a mounting chamber of the cover 2, and a sealing groove is provided on an inner wall of the mounting chamber, where the third sealing ring b3 is embedded in the sealing groove to hermetically separate the high-pressure face 66 and the low-pressure face 65.

Figure 5:
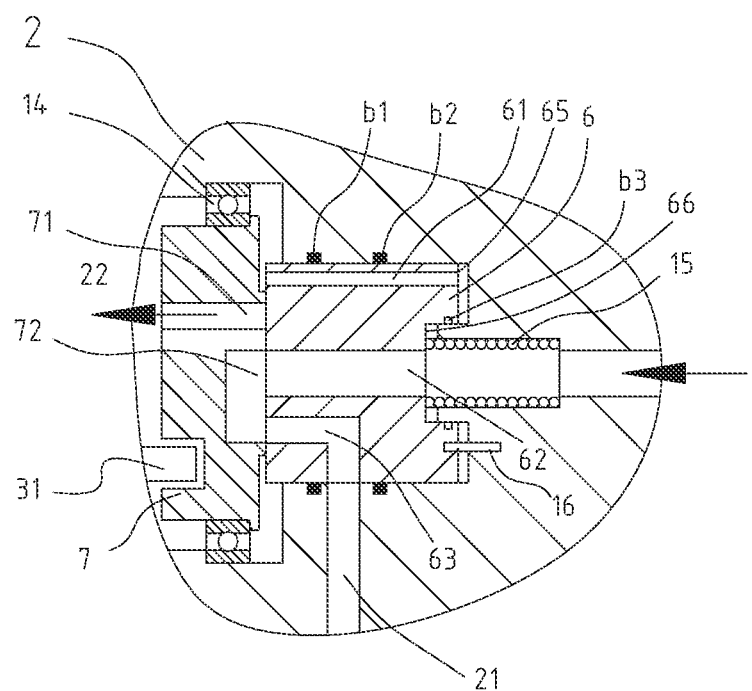
FIG. 5 is a schematic structural diagram of an air distribution mechanism when a high-pressure air passage is in a communicating state according to the present invention.
Figure 6:
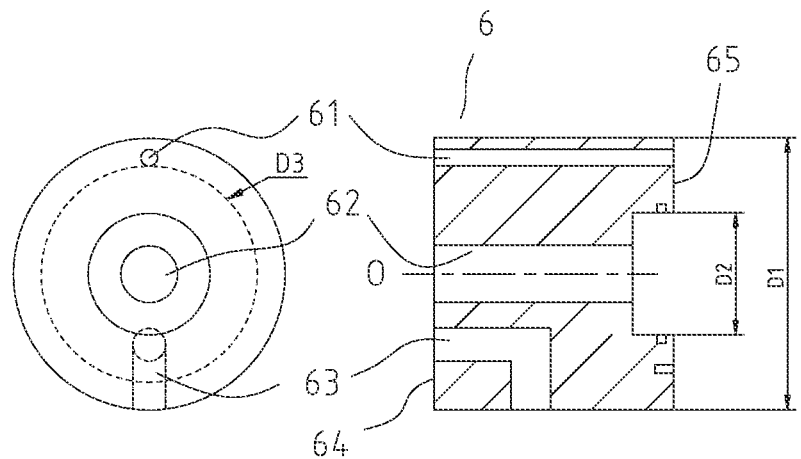
FIG. 6 is a detailed schematic structural diagram of an air distribution valve in FIG. 5.
Figure 7:
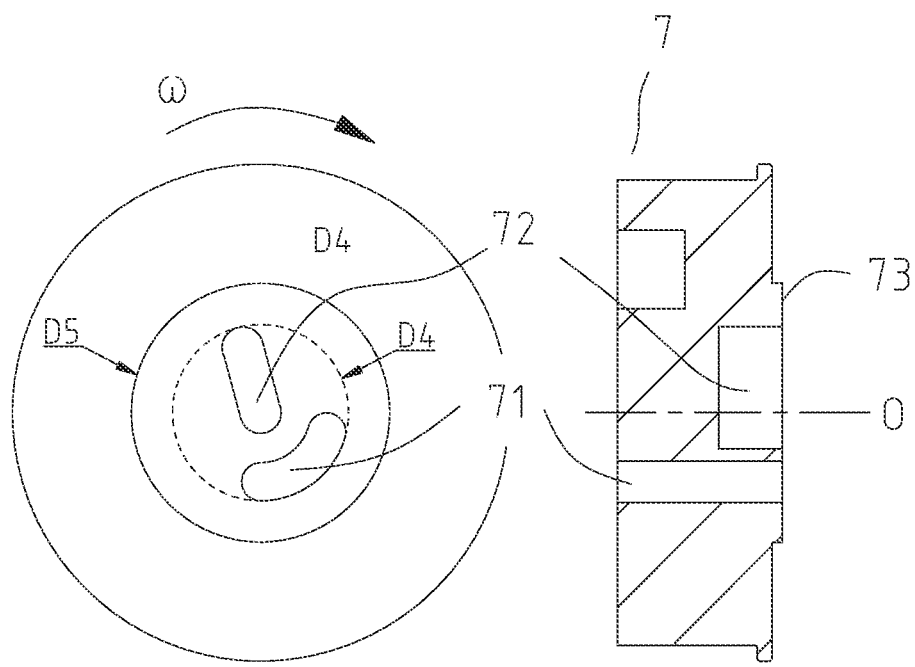
FIG. 7 is a detailed schematic structural diagram of a rotary valve in an air distribution mechanism according to the present invention.

As shown in FIG. 5 and FIG. 6, when the high-pressure face 66 is sunk relative to the low-pressure face 65, a protruding portion of the cover 2 is embedded in a groove corresponding to the high-pressure face 66, and a sealing groove is provided on an inner wall of the groove, where the third sealing ring b3 is embedded in the sealing groove to hermetically separate the high-pressure face 66 and the low-pressure face 65.

In the foregoing two cases, the high-pressure face 66 protrudes or is sunk relative to the low-pressure face 65, but an actual case is not limited to the two manners, and the high-pressure face 66 does not communicate with the pressure-relief hole 61.

In the self-pressure-relief air distribution mechanism of the foregoing structure, since the pressure-relief hole 61 on the air distribution valve 6 communicates with the low-pressure passage 22 in the cover 2 all the time, the pressure borne by the low-pressure face 65 is from the low-pressure airflow through the pressure-relief hole 61, In addition, the low-pressure face 65 and the high-pressure face 66 are separated, so that the low-pressure face 65 does not communicate with the high-pressure gas in the high-pressure air hole 62. Therefore, the high-pressure gas from the high-pressure exhaust pipe 1a received by the air distribution valve 6 acts on the high-pressure face 66 that is in contact with the high-pressure airflow. The air distribution face 64 is tightly pressed against the switching plane 73 by the positive high-pressure gas, to separate the high-pressure airflow and the low-pressure airflow in the air distribution mechanism. A contact area between the rear face of the air distribution valve 6 and the high-pressure gas in the high-pressure air hole 62 is reduced from an area corresponding to an outer diameter D1 of a conventional air distribution valve to an area of the sealing face corresponding to the outer diameter D2 of the high-pressure face 66, so that the positive pressure received by the air distribution valve 6 changes from conventional $(Ph-Pl) \times \pi \times D_1^2/4$ to $(Ph-Pl) \times \pi \times D_2^2/4$, where Ph is the high-pressure discharge pressure of the compressor 1, and Pl is the low-pressure return pressure of the compressor 1. In this way, the positive acting force is reduced, that is, by optimizing the pressure receiving area of the high-pressure face 66, the acting force of adhesion between the air distribution valve 6 and the rotary valve 7 can be minimized, thereby reducing wear between the switching plane 73 and the air distribution face 64 and prolonging the service life of the equipment.

A cryogenic refrigerator using a self-pressure-relief air distribution mechanism is provided, where the cryogenic refrigerator includes the foregoing self-pressure-relief air distribution mechanism. The air distribution valve 6 of the self-pressure-relief air distribution mechanism is eccentrically fixed on the cover 2 through a valve body positioning pin 16, and a spring 15 is embedded in a region on the high-pressure face 66 of the air distribution valve 6. The rotary valve 7 of the self-pressure-relief air distribution mechanism is positioned in the cover 2 through a bearing 14. The cryogenic refrigerator is a valve-switching refrigerator in any form, and is not limited to a Gifford-McMahon refrigerator, a Solvay refrigerator, a pulse tube refrigerator, and the like.

In the present invention, the pressure-relief hole 61 is provided, and the pressure receiving face of the air distribution valve 6 is divided into the low-pressure face 65 and the high-pressure face 66. The low-pressure airflow in the cover 2 can be guided to the rear face of the air distribution valve 6 through the pressure-relief hole 61, to reduce a high-pressure force receiving area of the rear face of the air distribution valve 6, thereby, reducing the positive pressure between the air distribution face 64 and the switching plane 73 of the rotary valve 7, reducing plane wear, and prolonging the service life of the equipment.

The foregoing embodiments are only used for explaining the technical idea of the present invention, and are not intended to limit the protection scope of the present invention. Any changes made based on the technical solutions and according to the technical idea provided by the present invention shall fall within the protection scope of the present invention. Technologies not involved in the present invention may all be implemented through the related art.

What is claimed is:

1. A self-pressure-relief air distribution mechanism, comprising an air distribution valve (6) and a rotary valve (7), wherein a rear face of the air distribution valve (6) is divided into a high-pressure face (66) and a low-pressure face (65), the high-pressure face (66) is located in the middle of the low-pressure face (65), and the high-pressure face (66) and the low-pressure face (65) are hermetically separated by a third sealing ring (b3) that seals the air distribution valve (6)

and a cover (2); the air distribution valve (6) is provided with a pressure-relief hole (61) that axially penetrates an air distribution face (64) and the low-pressure face (65) of the air distribution valve (6), a low-pressure passage (22) of the cover (2) can communicate with the rear face of the air distribution valve (6) via the pressure-relief hole (61), and a low-pressure airflow in the cover (2) can be guided to the rear face of the air distribution valve (6) through the pressure-relief hole (61), to reduce a positive pressure between the air distribution face (64) and a switching plane (73) of the rotary valve (7); a pressure-relief-hole inner-edge inner-diameter D3 of an inner edge circle formed by points corresponding to an inner edge of the pressure-relief hole (61) surrounding an axis of the air distribution valve (6) is greater than an outer diameter D5 of the switching plane (73); the outer diameter D5 of the switching plane (73) is greater than an outer diameter D4 of a switching region formed by a low-pressure hole (71) and a high-pressure groove (72) on the rotary valve (7); and an outer diameter D2 of a sealing face corresponding to the high-pressure face (66) is smaller than the outer diameter D4 of the switching region formed by the low-pressure hole (71) and the high-pressure groove (72) on the rotary valve (7).

2. The self-pressure-relief air distribution mechanism according to claim 1, wherein when the high-pressure face (66) protrudes relative to the low-pressure face (65), a portion corresponding to the high-pressure face (66) is embedded in a mounting chamber of the cover (2), and a sealing groove is provided on an inner wall of the mounting chamber, wherein the third sealing ring (b3) is embedded in the sealing groove to hermetically separate the high-pressure face (66) and the low-pressure face (65).

3. A cryogenic refrigerator using the self-pressure-relief air distribution mechanism according to claim 2, wherein the cryogenic refrigerator comprises the foregoing self-pressure-relief air distribution mechanism which includes the air distribution valve, and the air distribution valve (6) of the self-pressure-relief air distribution mechanism is fixed on the cover (2) through a valve body positioning pin (16), and a spring (15) is embedded in a region on a high-pressure face (66) of the air distribution valve (6); and the rotary valve (7) of the self-pressure-relief air distribution mechanism is positioned in the cover (2) through a bearing (14).

4. The self-pressure-relief air distribution mechanism according to claim 1, wherein when the high-pressure face (66) is sunk relative to the low-pressure face (65), a protruding portion of the cover (2) is embedded in a groove corresponding to the high-pressure face (66), and a sealing groove is provided on an inner wall of the groove, wherein the third sealing ring (b3) is embedded in the sealing groove to hermetically separate the high-pressure face (66) and the low-pressure face (65).

5. A cryogenic refrigerator using the self-pressure-relief air distribution mechanism according to claim 4, wherein the cryogenic refrigerator comprises the foregoing self-pressure-relief air distribution mechanism which includes the air distribution valve, and the air distribution valve (6) of the self-pressure-relief air distribution mechanism is fixed on the cover (2) through a valve body positioning pin (16), and a spring (15) is embedded in a region on a high-pressure face (66) of the air distribution valve (6); and the rotary valve (7) of the self-pressure-relief air distribution mechanism is positioned in the cover (2) through a bearing (14).

6. The self-pressure-relief air distribution mechanism according to claim 1, wherein the air distribution valve (6) is provided with a high-pressure air hole (62) that axially penetrates the air distribution valve (6), and an air distribution valve air hole (63) that penetrates the air distribution valve (6) in a folded direction, wherein the high-pressure air hole (62) can communicate with a high-pressure exhaust pipe (1a) of a compressor (1), and the air distribution valve air hole (63) can communicate with a cover air hole (21) on the cover (2).

7. The self-pressure-relief air distribution mechanism according to claim 6, wherein the high-pressure air hole (62) can communicate with the air distribution valve air hole (63) and the cover air hole (21) through the high-pressure groove (72) on the rotary valve (7), or the air distribution valve air hole (63) communicates with the low-pressure passage (22) on the cover (2) through the low-pressure hole (71) that penetrates the rotary valve (7).

8. A cryogenic refrigerator using the self-pressure-relief air distribution mechanism according to claim 7, wherein the cryogenic refrigerator comprises the foregoing self-pressure-relief air distribution mechanism which includes the air distribution valve, and the air distribution valve (6) of the self-pressure-relief air distribution mechanism is fixed on the cover (2) through a valve body positioning pin (16), and a spring (15) is embedded in a region on a high-pressure face (66) of the air distribution valve (6); and the rotary valve (7) of the self-pressure-relief air distribution mechanism is positioned in the cover (2) through a bearing (14).

9. A cryogenic refrigerator using the self-pressure-relief air distribution mechanism according to claim 7, wherein the cryogenic refrigerator comprises the foregoing self-pressure-relief air distribution mechanism which includes the air distribution valve, and the air distribution valve (6) of the self-pressure-relief air distribution mechanism is fixed on the cover (2) through a valve body positioning pin (16), and a spring (15) is embedded in a region on a high-pressure face (66) of the air distribution valve (6); and the rotary valve (7) of the self-pressure-relief air distribution mechanism is positioned in the cover (2) through a bearing (14).

10. The self-pressure-relief air distribution mechanism according to claim 1, wherein a first sealing ring (b1) and a second sealing ring (b2) that are embedded in an inner wall of a mounting chamber of the cover (2) are provided on a circumferential surface of the air distribution valve (6) to seal the air distribution valve (6) laterally.

11. A cryogenic refrigerator using the self-pressure-relief air distribution mechanism according to claim 10, wherein the cryogenic refrigerator comprises the foregoing self-pressure-relief air distribution mechanism which includes the air distribution valve, and the air distribution valve (6) of the self-pressure-relief air distribution mechanism is fixed on the cover (2) through a valve body positioning pin (16), and a spring (15) is embedded in a region on a high-pressure face (66) of the air distribution valve (6); and the rotary valve (7) of the self-pressure-relief air distribution mechanism is positioned in the cover (2) through a bearing (14).

12. A cryogenic refrigerator using the self-pressure-relief air distribution mechanism according to claim 1, wherein the cryogenic refrigerator comprises the foregoing self-pressure-relief air distribution mechanism which includes the air distribution valve, and the air distribution valve (6) of the self-pressure-relief air distribution mechanism is fixed on the cover (2) through a valve body positioning pin (16), and a spring (15) is embedded in a region on a high-pressure face (66) of the air distribution valve (6); and the rotary valve (7) of the self-pressure-relief air distribution mechanism is positioned in the cover (2) through a bearing (14).

* * * * *